INVENTOR.
RICHARD E. ROEGER
BY
Williams & Tilberry
ATTORNEYS

March 18, 1958   R. E. ROEGER   2,826,818
OPPOSED HEAD COMPARATOR
Filed March 7, 1955   3 Sheets-Sheet 2

INVENTOR.
RICHARD E. ROEGER
BY
Williams & Tilberry
ATTORNEYS

March 18, 1958  R. E. ROEGER  2,826,818
OPPOSED HEAD COMPARATOR
Filed March 7, 1955  3 Sheets-Sheet 3

INVENTOR.
RICHARD E. ROEGER
Williams &
Tilberry
ATTORNEYS

United States Patent Office 2,826,818
Patented Mar. 18, 1958

2,826,818

OPPOSED HEAD COMPARATOR

Richard E. Roeger, Mayfield Heights, Ohio, assignor to Cleveland Instrument Company, Cleveland, Ohio, a corporation of Ohio Application March 7, 1955, Serial No. 492,434

14 Claims. (Cl. 33—147)

This invention relates in general to measuring instruments and more particularly to improvements in gages, comparators and the like of the type employed to measure the surfaces of gage blocks.

In checking the accuracy of gage blocks heretofore, it has been necessary to "wring" the gage block to the anvil of the gaging device. That is to say, it has been necessary carefully to work together the adjacent surfaces of the anvil and the gage block until all of the entrapped air between the two surfaces has been worked out. This has been necessary when taking measurements in the neighborhood of one millionth of an inch since in this range entrapped air will cock the gage with respect to the anvil sufficiently to introduce intolerable error in the reading. Dust or other foreign matter between the gage block and the anvil will also make it difficult to obtain an accurate reading. In view of the uncertainty of the accuracy of such readings, a reasonably trustworthy reading can only be obtained after very careful adjustment of the gage blocks to the anvil, as aforesaid, which is in many cases objectionably time consuming.

It is an object of the present invention to provide an improved measuring device in which a pair of measuring heads are arranged so as to have their respective measuring tips opposed for direct contact with the opposite surfaces of a work piece. It is another object of the invention to provide a gage block checking device with which accurate readings in the area of one millionth of an inch can be obtained instantaneously and without the necessity of "wringing" the gage block to the anvil.

Other objects of the invention include the provision of a gage block comparator in which opposed measuring tips of opposed measuring heads are laterally as well as vertically adjustable with respect to each other; the provision of a gage block comparator in which a pair of measuring tips are adapted directly to engage opposite surfaces of a gage block; the provision of a gage block comparator adapted to use a simple work support platform rather than a conventional anvil having a finished work surface; the provision of a gage block comparator in which any distortion of the anvil due to the weight of the gage block will be automatically compensated to provide a true reading; the provision of a gage block comparator having opposed measuring heads wherein the heads may be used separately or together; and the provision of a gage block comparator having opposed measuring heads adjusted so as respectively to engage opposite sides of a workpiece with pressures adapted to prevent moving, shifting, or cocking of the workpiece with respect to its anvil or the gaging tips.

To the accomplishment of the foregoing and related ends, said invention then consists of means hereinafter fully described and particularly pointed out in the claims, the annexed drawings and the following description setting forth in detail certain structure embodying the invention, such disclosed means constituting, however, but one of various forms in which the principle of the invention may be used.

Figure 1:
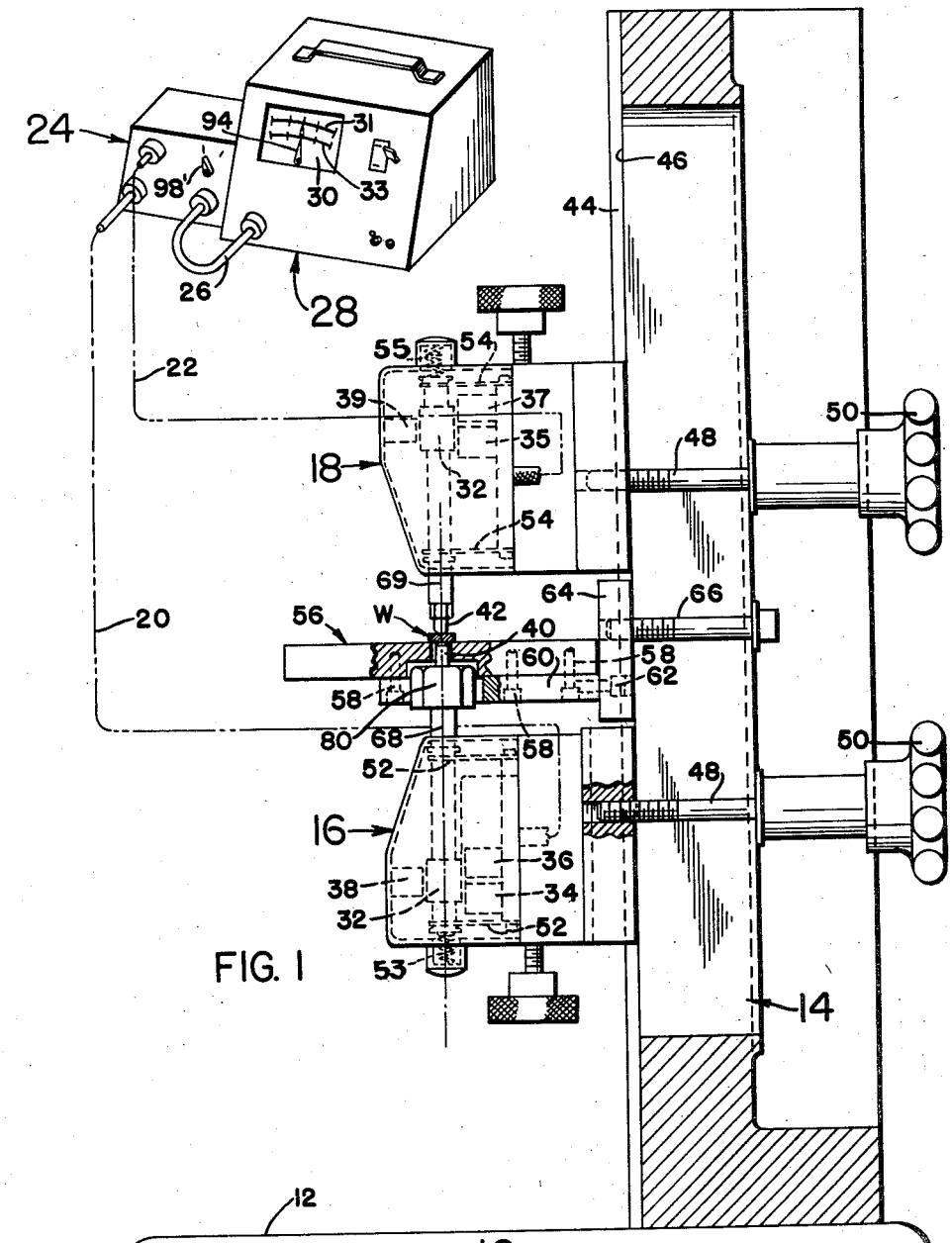
Figure 1 is a side elevational view of a preferred embodiment of the invention showing also in perspective the connections of the measuring heads to mixing and amplifier units.

Reference is now made to the drawings in greater detail, and in particular to Figure 1. In general, the apparatus comprises a measuring head supporting stand 10 (see Figure 1) having a base 12 and an upright member 14 rigidly secured to the base. A pair of measuring heads 16 and 18 are vertically aligned and adjustably secured to the upright member 14 of the supporting stand 10. Each measuring head is connected by cables 20 and 22 to a mixing unit 24 which feeds the mixed output of the measuring heads through line 26 to an amplifier 28, containing a meter 30 therein which translates the output of the measuring heads into a visual reading.

While the mechanism of the measuring heads 16 and 18 may be of any suitable construction, the heads preferably are constructed in accordance with Patent No. 2,627,119, issued February 3, 1953, in the name of Erwin W. Graham and assigned to the assignee of this application. These measuring heads embody electromagnetic transducers or pickups having movable armatures 32 which vary the reluctance of magnetic circuits linking pairs of pickup coils 34 and 36 and 35 and 37 with exciter coils 38 and 39 respectively, the output of the transducers being connected to the mixing unit 24. The circuit of the amplifying unit 28, to which the mixing unit 24 is connected, is preferably constructed and arranged in accordance with the disclosure of United States Patent No. 2,508,370, issued May 23, 1950, in the name of Michael Bozoian and also assigned to the assignee of this application.

The measuring heads 16 and 18 (see Figure 1) have opposed measuring tips 40 and 42 in vertical alignment and the measuring heads 16 and 18 are vertically adjustable on ways 44 machined on face 46 of the upright member 14 of the supporting stand 10. Each measuring head may be securely locked at any portion of the ways 44 by means of threaded studs 48 having hand knobs 50 rigidly secured to the right ends thereof. The frictionless reed springs 52 which carry the armature 32 of the lower measuring head 16 are of sufficient strength to support the weight of the armature and to maintain the measuring tip 40 in pressure contact with the lower side of the workpiece W. The reed springs 54 which carry the armature 32 of the upper measuring head 18 are of the same strength as the lower reed springs 52, and variable pressure coil springs 53 and 55 are employed at opposite ends of said armatures 32 to adjust the pressures of the measuring tips 40 and 42 against the workpiece W, so that the resultant pressure against the workpiece is directed downwardly.

A workpiece supporting platform 56 rests on and is fastened by screws 58 to a bracket 60. Bracket 60 is secured by screws 62 to a slidable adjusting block 64 maintained in engagement with ways 44 of the supporting stand upright member 14 by means of threaded stud 66. Since block 64 is vertically adjustable on ways 44 of the upright member 14 independent of the vertical adjustment of the measuring heads 16 and 18, the moment caused by the weight of the workpiece W on the platform 56 will be about a center, the locus of which is in the upright member 14 and therefore tends to maintain the platform and the measuring heads in relative alignment at all times.

When measuring workpieces such as gage blocks and the like, it is necessary with the present apparatus that the measuring tips 40 and 42 be in axial concentricity. Accordingly, means are provided universally to adjust the lower measuring tip 40 in a plane normal to the longitudinal axes of the measuring tips, whereby the respective longitudinal axes 68 and 69 of the measuring tips 40 and 42 may be brought into aligned concentricity.

Figure 2:
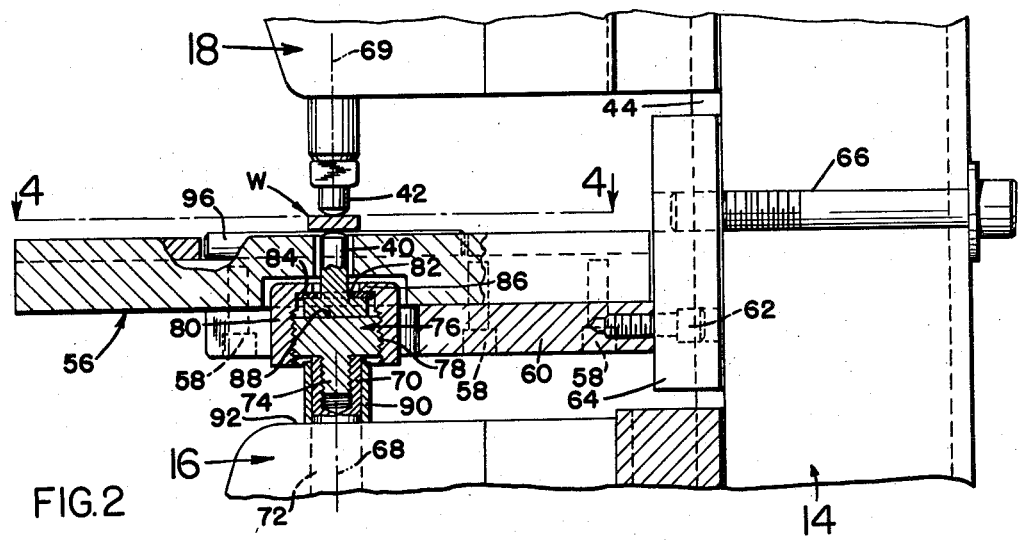
Figure 2 is an enlarged fragmentary side elevational view of the measuring head tip adjusting means shown in Figure 1.
Figure 3:
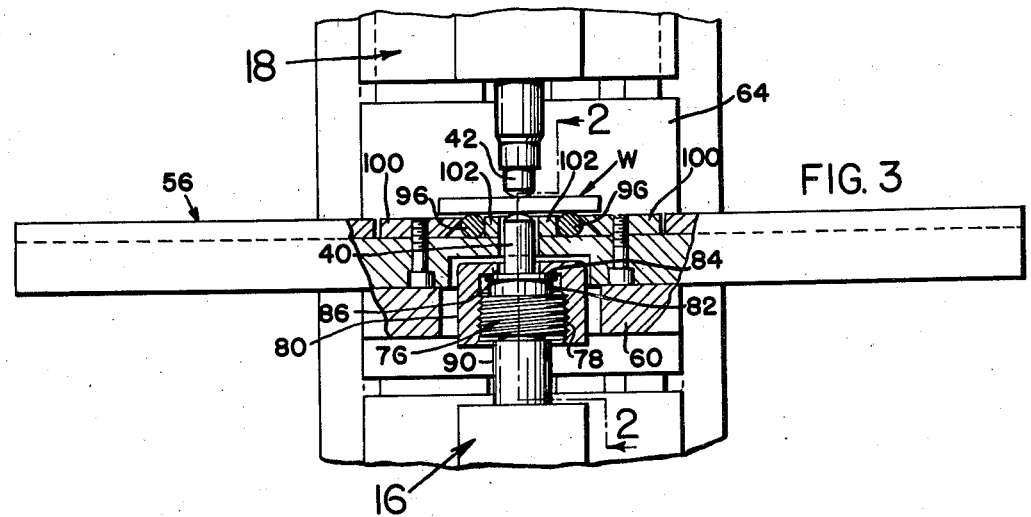
Figure 3 is an enlarged fragmentary front elevational view of the tip adjusting means similar to that of Figure 2.

Referring now in particular to Figures 2 and 3, it will be seen that the top end portion 70 of the armature shank 72 is tapped and threaded to receive therein the threaded shank portion 74 of a bearing block 76. The bearing block 76 is of a cylindrical disc shape, having threaded sidewalls 78 to engage the inner threads of a lock nut 80. The base of the measuring tip 40 is provided with a flange 82, the upper surface of which carries a seating washer 84. The top edge of the lock nut 80 is turned inwardly as at 86 to bear against the seating washer 84, which in turn clamps the flange 82 of the measuring tip 40 against the top surface 88 of the bearing block 76. Sufficient tolerance is provided between the lock nut 80 and the gaging tip flange 82 to enable it to engage in universal movement in a plane perpendicular to the axes 68 and 69 of the measuring tips 40 and 42.

The upper end 70 of the armature shank 72 which supports the bearing block 76 is sheathed in a sleeve 90 rigidly secured to the top surface 92 of the lower measuring head 16. Clearance is provided between armature shank end 70 and sleeve 90 so that the movement of the end 70 is frictionless with respect to the sleeve 90. If the lock nut 80 is loosened slightly, the measuring tip 40 is free to slide about the top surface 88 of the bearing block 76. By bringing the measuring tips into contact with each other, and then by watching the needle 94 on the amplifier meter 30, it is possible to align the axes 68 and 69 of the measuring tips within the tolerances required for the work being gaged.

Figure 4:
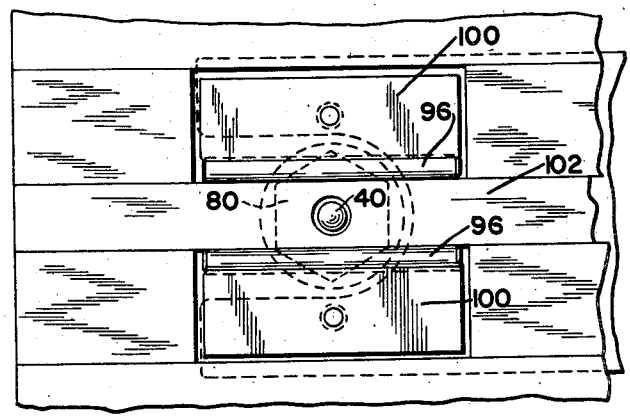
Figure 4 is an enlarged fragmentary plan view of an anvil which may be used with the embodiment of the invention shown in Figure 1.

The anvil shown in Figures 2–4 comprises a pair of rods 96 (see Figures 3 and 4) aligned so that their top surfaces are just above the adjacent plates 100 which hold the rods securely in place against the abutting plate 102. It is to be stressed, however, that this type of anvil is not actually required with the present invention since a reasonably flat surface is all that is needed. It is not necessary to "wring" a gage block onto a flat surface because the block is engaged from both the top and the bottom by measuring tips 40 and 42 which are dependent on their contact with the block alone and not on the necessity of resting the gage block squarely on the anvil surface. It has been found that any slight cocking of the gage block due to entrapped air between the flat surface and the gage block is so slight that no inaccuracy is introduced in measuring the thickness of the gage block in contact with the gaging tips.

In operation, a master gage block W is placed between the measuring tips to zeroize the instrument, whereinafter the difference between the thickness of the master gage block and other gage blocks placed between the measuring tips is noted or detected by the measuring tips. It is this difference between the thickness of the gage blocks that is recorded on the dial of the amplifier. If the gaging tips are adjusted to read zero for a gage block having a thickness of one inch, then any subsequent gage block placed between the measuring tips will deflect the measuring tips away from the zero setting to indicate the amount that the subsequent gage block is undersize or oversize relative to the zero gage block. Thus, the apparatus functions as a comparator. It has been found that measurements within a millionth of an inch can be accurately and repeatedly taken with ease and without any time spent in "wringing" the block to the work support table surface. In operation, a workman need merely place the edge of the gage block adjacent the rounded surfaces of the measuring tips and slide the gage block slowly between the measuring tips while observing the needle on the meter to note whether or not the deviations in the surfaces of the gage block are within the permissible tolerances.

When the gaging or measuring heads 40 and 42 are being used together to measure the surfaces of a gaging block, the output of the measuring heads is additive in that the total movement of the measuring tips toward each other will be reflected by the needle on the dial to the left of zero, and the total movement of the gaging tips away from each other will be reflected by the movement of the dial to the appropriate division on the opposite side of zero of the scale. Thus it is that the total deviation of the gage block from zero is recorded by probing both the upper and lower surfaces simultaneously with the measuring tip. It is also possible selectively to use either the upper or the lower measuring head independently of the other. The gang switch knob 98' on the mixing unit enables the operator to select either the upper or the lower measuring head, or to place them both in operation at the same time by means of the gang switch.

Figure 5:
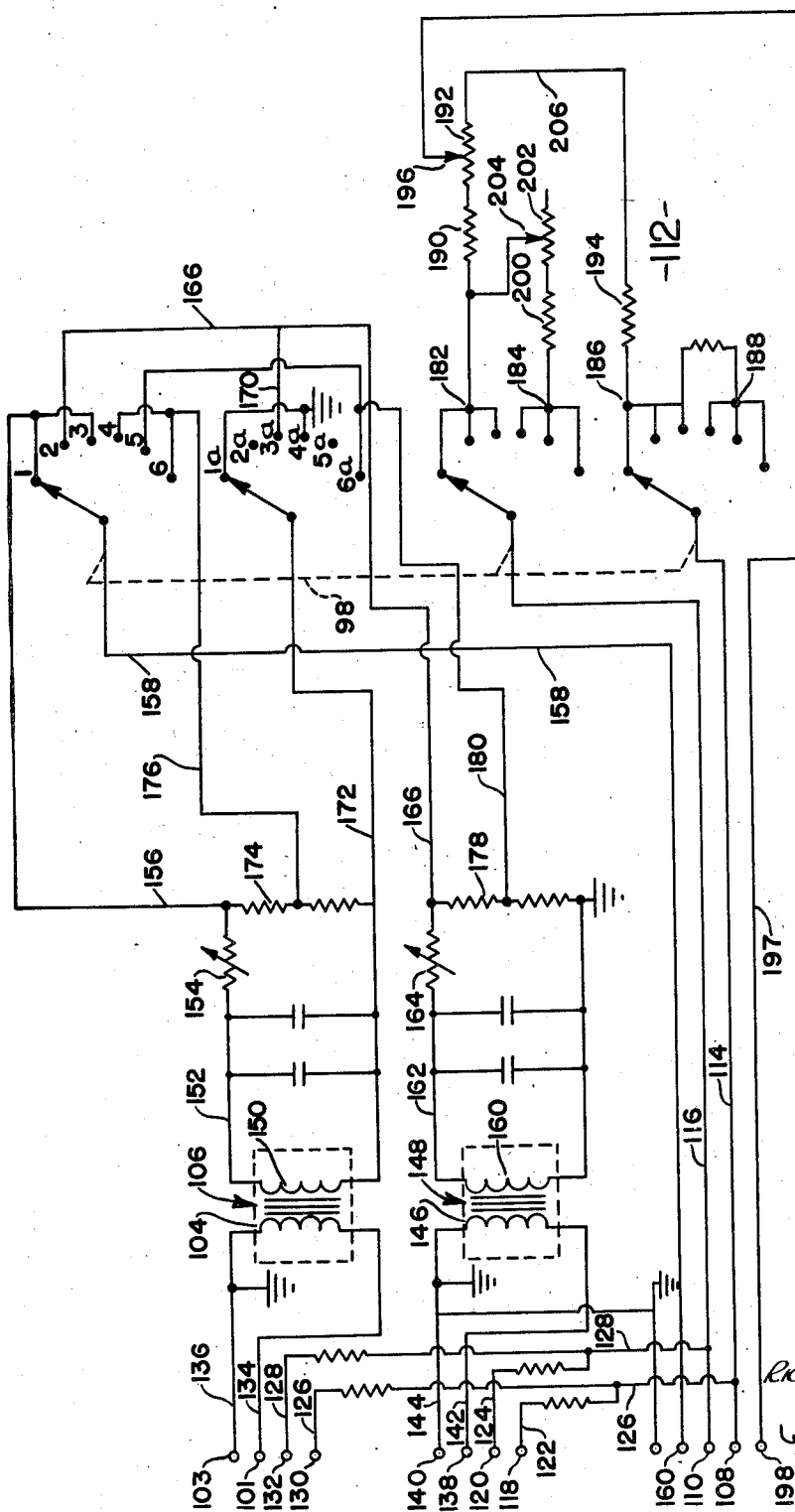
Figure 5 is a schematic diagram of the electrical circuit employed in a preferred embodiment of the invention.

By referring to Figure 5, it will be seen how the gang switch 98 enables the operator selectively to operate either head or both simultaneously. Leads from the pair of pickup coils 34 and 36 of measuring head 16 are included in cable 20 and are connected to terminals 138 and 140. Leads from the pair of pickup coils 35 and 37 of measuring head 18 are included in cable 22 and are connected to terminals 101 and 103. A source of six volt alternating current is connected to terminals 108 and 110 to supply current to the centering control 112 along leads 114 and 116, and to the exciter coils 38 and 39 of the measuring heads 16 and 18. The leads from the exciter coil 38 of measuring head 16 are also contained in cable 20 and are connected to terminals 118 and 120. Leads 122 and 124 connect terminals 118 and 120 to leads 126 and 128 which are connected to the six volt A. C. supply leads 114 and 116. In like manner, the leads from the exciter coil 39 of measuring head 18 are contained in cable 22 and are connected to terminals 130 and 132. Leads 126 and 128, connected to terminals 130 and 132, are, as aforesaid, connected to the six volt A. C. supply leads 114 and 116. Suitable resistances are included in leads 122—128 inclusive.

Thus it will be seen that a source of six volt alternating current is supplied to energize exciter coils 38 and 39 of measuring heads 16 and 18. These coils 38 and 39 excite pairs of pickup coils 34 and 36, and 35 and 37, respectively in measuring heads 16 and 18. The leads from the pickup coils 35 and 37 of measuring head 18 are connected through terminals 101 and 103 to leads 134 and 136 of the primary coil 104 of microphone transformer 106. This completes a primary signal circuit from measuring head 18 to transformer 106. The leads from the pickup coils 34 and 36 of measuring head 16 are connected through terminals 138 and 140 to leads 142 and 144 of the primary coil 146 of microphone transformer 148. A primary signal circuit is, therefore, also completed from measuring head 16 to transformer 148.

With the gang switch 98 at the number one position, as shown, measuring head 18 only is connected to provide an ultimate reading on an upper sensitivity scale 31 of the meter 30. A signal received at the primary coil 104 of the microphone transformer 106, in the manner set forth hereinabove, is transmitted to and amplified by secondary coil 150. The path of the signal is then traceable along lead 152, through variable rheostat 154, lead 156, gang switch terminal position No. 1, and finally through lead 158 which is connected to terminal 160. A suitable lead (not shown) thereafter carries the signal to the grid of the first vacuum tube in the amplifier 28. Inasmuch as the amplifier circuit does not constitute a part of this invention, no detailed description of it will be undertaken. Any suitable amplifier circuit may be used, and preferably the circuit disclosed in Patent No. 2,508,370, issued to Mr. Bozoian and assigned to the assignee of the present application.

By changing gang switch 98 from the No. 1 to the No. 2 position, measuring head 18 is disconnected and measuring head 16 is connected to the circuit of Figure 5. A signal received at the primary coil 146 of the microphone transformer 148 is transmitted to and amplified by secondary coil 160. The path of this signal is then traceable along lead 162, through variable rheostat 164, lead 166, gang switch terminal position No. 2 and finally through common lead 158 to output terminal 169, as aforesaid. Variable rheostats 154 and 164 are inserted in their respective leads 152 and 162 to balance electrically both measuring heads for sensitivity.

Position No. 3 of the gang switch simultaneously connects both measuring heads to the circuit, in which case the path of the signal from measuring head 18 remains the same, but the signal from measuring head 16 is shunted from lead 166 across line 170, contact 3a, and lead 172 to the lower side of secondary transformer coil 150 where it modifies the signal from measuring head 18.

Positions 4, 5 and 6 of the gang switch 98 correspond to positions 1, 2 and 3 respectively for readings on a lower sensitivity scale 33 of the meter 30 (see Figure 1). Position 4 connects measuring head 18; position 5 connects measuring head 16; and position 6 connects both measuring heads. However, the signal from measuring head 18, instead of following lead 156, passes through resistance 174 and lead 176 to the gang switch 98. The signal from measuring head 16 passes through resistance 178 and lead 180 to gang switch 98.

The voltage signals from the two measuring heads are algebraically additive, so that movement of measuring tips 40 and 42 oppositely away from each other generates respective signals which are additive on the positive side of the meter scale. Conversely, movement of measuring tips 40 and 42 oppositely toward each other generates respective signals which are additive on the negative side of the meter scale. When measuring tips 40 and 42 are moved simultaneously in the same direction and an equal distance, the generated signals balance or cancel each other out. When the movements between the two heads are in the same direction but of unequal distances, then the resultant signal is the arithmetic difference between each signal generated by the separate movements of the measuring tips.

When both heads are connected to the circuit of Figure 5 and a gage block is passed between measuring tips 40 and 42 in the prescribed manner set forth, the distances between opposite faces of the blocks are compared. In order to detect variations in the surface of one face only, the gaging operation is repeated using the measuring heads separately in conjunction with the face in contact with the measuring tip of the connected measuring head. For this operation, however, it is necessary that the gage block be maintained normal to its gaging tip so that a rod type anvil such as shown in the figures, or any other type anvil having an exceedingly flat surface in contact with the gage block, is employed to insure an accurate measurement.

The centering control circuit 112 has gang switch contacts corresponding to contacts 1—6 and 1a—6a of the measuring head circuit. It will be observed that there are four effective contacts 182, 184, 186 and 188, each having three branches connected to a common junction. This arrangement has been adapted for practical considerations and has no bearing on the theory of operation of the overall circuit.

With the gang switch on any of the upper sensitivity scale positions 1 to 3, a six volt alternating current circuit is completed through lead 116, switch contact 182, resistance 190, potentiometer 192, resistance 194, contact 186 and lead 114. Lead 158 is connected through terminal 160 to the grid of the first tube of the amplifier 28, and the adjustable tap 196 of potentiometer 192 supplies voltage to the grid of the second tube of the amplifier 28 through lead 197 and terminal 198.

When the gang switch makes contact with any of the lower sensitivity scale positions 4 to 6, the six volt alternating current circuit in the centering control circuit is completed through lead 116, switch contact 184, resistance 200 and rheostat 202, resistance 190, potentiometer 192, lead 206, resistance 194, resistance 195, switch contact 188, lead 114, and terminal 108. Grid voltage is supplied to the amplifier through potentiometer tap 196, lead 197 and terminal 198.

While herein shown and described is a preferred embodiment of the invention, it is contemplated that the invention is susceptible of embodiment in other forms, and is applicable to a great variety of situations, without departing from the spirit or scope of the invention.

I claim:

1. Work gaging apparatus comprising a base, a measuring head supporting column rigidly secured to said base, a pair of measuring heads secured to said column one above the other and at least one of said heads being vertically adjustable thereon, work supporting means secured to said column between said measuring heads, and opposed measuring tips extending from the said respective measuring heads to contact opposite surfaces of a workpiece supported on said work supporting means.

2. Work gaging apparatus comprising a base, a measuring head supporting column rigidly secured to said base, a pair of measuring heads secured to said column one above the other and at least one of said heads being vertically adjustable thereon, a work supporting platform secured to said column between said measuring heads, opposed measuring tips extending from the said respective measuring heads to contact opposite surfaces of a workpiece supported on said platform, and means for applying differential pressures to said measuring tips adapted to urge said tips into contact with said workpiece surfaces whereby the pressure of the upper tip overcomes the pressure of the lower tip to maintain the workpiece seated on the said platform.

3. In a work gaging comparator having a base, a measuring head supporting column rigidly secured to said base, a pair of measuring heads secured to said column one above the other and at least one of said heads being vertically adjustable thereon, and opposed measuring tips extending from the said respective measuring heads to contact opposite surfaces of a workpiece placed therebetween, the improvement comprising means to adjust one measuring tip with respect to the other universally normal to their longitudinal axes including a detached measuring tip having a flanged base, a bearing surface member adapted to support said flanged base, said bearing surface member being connected to measuring head actuating means, and means for locking said measuring tip rigidly to said bearing surface member.

4. In a work gaging comparator having a base, a measuring head supporting column rigidly secured to said base, a pair of measuring heads secured to said column one above the other and at least one of said heads being vertically adjustable thereon, and opposed measuring tips having parallel axes extending from the said respective measuring heads to contact opposite surfaces of a workpiece placed therebetween, the improvement comprising means transversely to adjust the longitudinal axis of one measuring tip with respect to the other including a detached measuring tip having a flanged base, a bearing surface member adapted to support said flanged base thereupon, said bearing surface member being connected to measuring head actuating means, and a lock nut adapted threadedly to engage said bearing surface member and to clamp said flanged base rigidly thereto.

5. In a work gaging comparator having a base, a measuring head supporting column rigidly secured to said base, a pair of measuring heads secured to said column one above the other and at least one of said heads being vertically adjustable thereon, and opposed measuring tips extending from the said respective measuring heads to contact opposite surfaces of a workpiece placed therebetween, the improvement comprising a workpiece supporting platform adjustably secured to said supporting column between said measuring heads for vertical adjustment independent of the position of said measuring heads, whereby the moment set up by a workpiece placed on said supporting platform is transferred directly to said supporting column, thus maintaining the positional relationship of the measuring heads with respect to a platform supported workpiece.

6. A work gaging comparator comprising a base, a measuring head supporting column rigidly secured to said base, a pair of measuring heads secured to said column one above the other and at least one of said heads being vertically adjustable thereon, opposed measuring tips extending from the said respective measuring heads to contact opposite surfaces of a workpiece therebetween, and means to indicate the movements of said measuring tips, the indications of said movements being algebraically additive.

7. A work gaging comparator comprising a base, a measuring head supporting column rigidly secured to said base, a pair of measuring heads secured to said column one above the other and at least one of said heads being vertically adjustable thereon, opposed measuring tips extending from the said respective measuring heads to contact opposite surfaces of a workpiece therebetween, means for selectively indicating the movement of each measuring tip or additively indicating the combined movement of both measuring tips with respect to said workpiece.

8. A work gaging comparator comprising a base, a measuring head supporting column rigidly secured to said base, a pair of electromagnetic measuring heads secured to said column one above the other and at least one of said heads being vertically adjustable thereon, opposed measuring tips extending from the said respective measuring heads to contact opposite surfaces of a workpiece therebetween, means for selectively detecting the electric signal output of each measuring head or additively to mix and detect the mixed electric signal output of both measuring heads, and means for amplifying and indicating a selected signal.

9. In a workpiece gaging apparatus having a pair of electromagnetic measuring heads with opposed measuring tips extending from their respective measuring heads to contact opposite surfaces of a workpiece, measuring head signal receiving and mixing means comprising a first transformer; signal transmitting leads from one of said measuring heads to the opposite sides of the primary coil of said first transformer; a first gang switch block having first, second and third position contacts, said first and third contacts having a common connection; a lead from one side of the secondary coil of said first transformer to the said common connection; a position selector switch connected to the grid circuit of a vacuum tube amplifier; a meter connected to said amplifier; a second gang switch block having first and third position contacts, said first position contact being connected to ground; a second position selector synchronized for movement with said first mentioned position selector and connected to the other side of said secondary coil; a second transformer; signal transmitting leads from the other of said measuring heads to the opposite sides of the primary coil of said second transformer; one side of the secondary coil of said second transformer being connected to the second position of said first gang switch block and to the third position of said second gang switch block; and the other side of said secondary coil of said second transformer being connected to ground, whereby with said synchronized position selectors on their respective number one positions, a signal may be received and amplified from one of said measuring heads; with the first of said position selectors at the number two position, a signal from the other of said measuring heads is received and amplified; and with the position selectors at their respective number three positions, signals from said measuring heads are received, mixed and amplified.

10. The gage set forth in claim 9, including a variable rheostat in series with the lead from one side of the secondary coil of said first transformer to said common connection; and a variable rheostat in series with the lead from one side of said second transformer to the second position of said first gang switch, whereby said rheostats are adapted electrically to balance both of said measuring heads for sensitivity.

11. The gage set forth in claim 9, including meter centering control means comprising a potentiometer and a lead from said potentiometer to said grid circuit.

12. The gaging device set forth in claim 9, wherein each of said measuring heads comprises an exciter coil; a source of low voltage alternating current to energize said exciter coil; a pair of pickup coils connected in series, opposite in phase and with their end leads connected to the primary coil of their respective transformer; and an iron core armature between said exciter coil and said pair of pickup coils, whereby movement of the measuring tip secured to said armature generates a signal in said measuring head; said measuring heads being in phase to generate signals which are additive when said measuring tips are moved oppositely with respect to each other.

13. Work gaging apparatus comprising a frame structure including a column extending from said frame structure, a pair of measuring heads carried by said frame structure with at least one of said measuring heads carried by said column and adjustable along said column with respect to the other measuring head, a measuring tip carried by each of said measuring heads and so disposed that said tips face each other, an anvil mounted on said column and having a work locating portion normal to said column and extending outwardly therefrom between said measuring head tips; said work locating portion having a passageway therethrough adapted to permit one of said tips to engage the surface of a workpiece adjacent to said anvil work locating portion; and said anvil being adapted to be adjustably positioned between said tips to permit said tips to co-act with each other by engaging opposite surfaces of said workpiece.

14. Work gaging apparatus comprising a frame structure and a column extending from said frame structure, a pair of measuring heads carried by said frame structure with at least one of said measuring heads carried by said column and adjustable along said column with respect to the other measuring head, a measuring tip carried by each of said measuring heads and so disposed that said tips face each other, an anvil mounted on said column and having a work locating portion normal to said column and extending outwardly therefrom between said measuring head tips; said work locating portion having a passageway therethrough adapted to permit one of said tips to engage the surface of a workpiece adjacent to said anvil work locating portion; said anvil being adapted to be adjustably positioned between said tips to permit said tips to co-act with each other by engaging opposite surfaces of said workpiece; and means for applying differential pressures to said measuring tips adapted to urge said tips into contact with said workpiece surfaces whereby the pressure of the tip engaging the surface of the workpiece adjacent to said anvil work locating portion is less than and is overcome by the pressure of the other tip to maintain the workpiece adjacent to and in contact with said anvil work locating portion.

References Cited in the file of this patent

UNITED STATES PATENTS

| | | |
|---|---|---|
| 2,508,370 | Bozoian | May 23, 1950 |
| 2,627,119 | Graham | Feb. 3, 1953 |
| 2,633,642 | Levesque | Apr. 7, 1953 |
| 2,691,826 | Breisch | Oct. 19, 1954 |